(12) United States Patent
Bifulco et al.

(10) Patent No.: US 9,794,244 B2
(45) Date of Patent: Oct. 17, 2017

(54) METHOD FOR OPERATING A NETWORK AND A NETWORK

(71) Applicant: NEC EUROPE LTD., Heidelberg (DE)

(72) Inventors: Roberto Bifulco, Heidelberg (DE); Ghassan Karame, Heidelberg (DE)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/904,951

(22) PCT Filed: Aug. 6, 2013

(86) PCT No.: PCT/EP2013/066435
§ 371 (c)(1),
(2) Date: Jan. 14, 2016

(87) PCT Pub. No.: WO2015/018436
PCT Pub. Date: Feb. 12, 2015

(65) Prior Publication Data
US 2016/0164853 A1 Jun. 9, 2016

(51) Int. Cl.
*H04L 29/06* (2006.01)
(52) U.S. Cl.
CPC .......... *H04L 63/08* (2013.01); *H04L 63/0823* (2013.01); *H04L 63/102* (2013.01)
(58) Field of Classification Search
CPC ..................................................... H04L 63/08
See application file for complete search history.

(56) References Cited

U.S. PATENT DOCUMENTS

| 8,448,238 | B1 | 5/2013 | Gupta et al. | |
|---|---|---|---|---|
| 9,038,151 | B1* | 5/2015 | Chua | H04L 45/02 709/223 |
| 2005/0257267 | A1* | 11/2005 | Williams | H04L 63/1408 726/25 |
| 2008/0092224 | A1* | 4/2008 | Coulas | H04L 45/00 726/12 |
| 2011/0231654 | A1* | 9/2011 | Somadder | H04L 12/5691 713/153 |
| 2012/0303425 | A1* | 11/2012 | Katzin | G06Q 20/027 705/14.4 |
| 2013/0268753 | A1* | 10/2013 | Vanderpol | H04L 63/123 713/155 |

(Continued)

FOREIGN PATENT DOCUMENTS

WO WO 2014128265 A1 * 8/2014 ......... H04L 43/0864

OTHER PUBLICATIONS

Yu, D., Moore, A. W., Hall, C., & Anderson, R. (Mar. 2013). Authentication for resilience: the case of SDN. In Cambridge International Workshop on Security Protocols (pp. 39-44). Springer Berlin Heidelberg.*

(Continued)

*Primary Examiner* — Shawnchoy Rahman
(74) *Attorney, Agent, or Firm* — Leydig, Voit & Mayer, Ltd.

(57) ABSTRACT

A method for operating a network in which a Software-Defined Networking (SDN) functionality between at least some of a plurality of elements of the network is realized by at least one controller. The method includes providing a secure proof of at least one network property. The secure proof of the at least one network property is provided by the SDN functionality.

22 Claims, 1 Drawing Sheet

(56) References Cited

U.S. PATENT DOCUMENTS

| | | | | |
|---|---|---|---|---|
| 2013/0283374 | A1* | 10/2013 | Zisapel | H04L 63/1441 |
| | | | | 726/22 |
| 2014/0269724 | A1* | 9/2014 | Mehler | H04L 45/30 |
| | | | | 370/392 |
| 2016/0164853 | A1* | 6/2016 | Bifulco | H04L 63/08 |
| | | | | 726/7 |

OTHER PUBLICATIONS

Veltri, Luca, et al. "Supporting information-centric functionality in software defined networks." Communications (ICC), 2012 IEEE International Conference on. IEEE, 2012.*

Ghassan O Karame: "Towards Trustworthy Network Measurements" In: Huth M et al (Eds.): "Trust 2013, LNCS 7904", Jun. 17, 2013 (Jun. 17, 2013), pp. 1-9.

Evangelos Haleplidis et al: "software-Defined Networking: Experimenting with the Control to Forwarding Plane Interfacing", Software Defined Networking (EWSDN), 2012 European Workshop on, IEEE, Oct. 25, 2012 (Oct. 25, 2012), pp. 91-96, XP032283476.

Karame G O et al: "On the Security of End-to-End Measurements Based on Packet-Pair Dispersions", IEEE Transactions on Information Forensics and Security, vol. 8, No. 1, Jan. 1, 2013 (Jan. 1, 2013), pp. 149-162, XP011487922.

John R. Douceur: "The Sybil Attack" In: "Peer-to-Peer Systems", Jul. 3, 2002 (Jul. 3, 2002), XP055113450, vol. 2429, pp. 251-260.

* cited by examiner

METHOD FOR OPERATING A NETWORK AND A NETWORK

CROSS REFERENCE TO RELATED APPLICATIONS

This application is a U.S. National Stage Application under 35 U.S.C. §371 of International Application No. PCT/EP2013/066435 filed on Aug. 6, 2013. The International Application was published in English on Feb. 12, 2015 as WO 2015/018436 A1 under PCT Article 21(2).

FIELD

The present invention relates to a method for operating a network, wherein a Software-defined Networking (SDN) functionality between at least some of a plurality of elements of the network is realized by at least one controller and wherein a secure proof of at least one network property is provided.

Further, the present invention relates to a network, wherein an SDN functionality between at least some of a plurality of elements of the network is realized by at least one controller and wherein a secure proof of at least one network property is provided.

BACKGROUND

In current internet, end-users consider the network like a black-box that provides connectivity between two end-points. The security properties, e.g. path guarantees, accountability, properties of connecting hosts, etc., of a communication must be enforced by the endpoints through e.g., encryption/authentication primitives.

An interesting case is when an endpoint does not trust the claims of the machine at the other end of the communication; this could include the location of the machine, among others. In these cases, the network operator could provide a proof that the untrusted endpoint, e.g., is actually located where it claims to be.

For simplicity and without loss of generality, assume that an online banking service is provided by endpoint B, and consider the case where a user located at endpoint C wishes to access the online banking service. Here, we consider the case where B allows connections only to endpoints located in a given country, e.g. due to legislations, liability, etc.

Whenever C is accessing the banking service, B would like to ensure that C is indeed located within a given country. In typical cases, the only way for C to provide a proof of location is to contact its network administrator and acquire such guarantee. While the network itself could in theory provide for such guarantees, this process is quite cumbersome in traditional networks, since it requires a manual intervention, and/or a number of mail exchanges in order to set up such guarantees in practice.

SUMMARY

In an embodiment, the present invention provides a method for operating a network. A Software-Defined Networking (SDN) functionality between at least some of a plurality of elements of the network is realized by at least one controller. The method comprises providing a secure proof of at least one network property. The secure proof of the at least one network property is provided by the SDN functionality.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
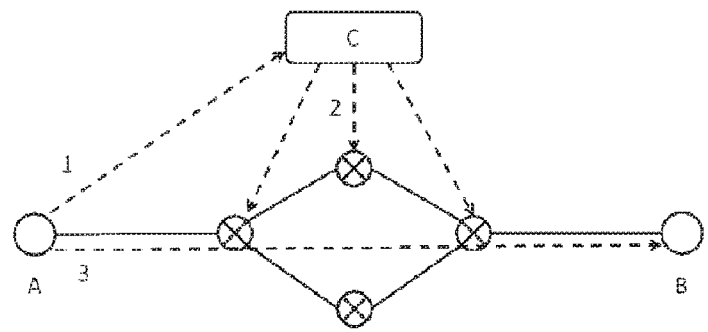
FIG. 1 depicts trustworthy network paths for a single SDN domain.

Generally, by separating the control plane and data plane, SDNs promise one of the few workable possibilities to automatically and dynamically control network paths.

An embodiment of the present invention provides a method for operating a network and an according network for allowing a very simple and resource saving provision of secure proofs of network properties.

According to an embodiment, a method is characterized in that the secure proof of the at least one network property is provided by the SDN functionality.

According to an embodiment, a network is characterized in that the SDN functionality is enhanced for providing the secure proof of the at least one network property.

According to an embodiment of the invention, it has been recognized that it is possible to simply use already present functionalities for solving the above object. Concretely, the present SDN functionality will be used for providing the secure proof of at least one network property. This inventive solution is very simple and resource saving only incurring minimal overhead on a SDN controller.

A secure proof of various network properties is possible and within a preferred embodiment the network property can be network location and/or path property and/or path guarantee. This includes the establishment of "trustworthy paths" that traverse only a selected number of routers or switches, e.g., or that exhibit a given quality metric, providing a proof of location, among other services etc.

The leveraged SDN functionality can preferably automatically and securely establish provable network guarantees to its clients or users.

Within a further preferred embodiment a federation of OpenFlow domains can be realized. Within a further concrete embodiment a PKI, Public Key Infrastructure, can be provided within the network. Further preferred, all controllers or a definable number of controllers know each other's public key.

Where appropriate a trusted computing base can be provided within the network. In this case a tamper-resistant hardware, e.g. Trusted Platform Modules, can be realized that populates at least one controller.

Within a further preferred embodiment at least one network user or each network user can be equipped with a public key and private key pair. Such a pair can be denoted in the sequel by pku, sku for user u.

Within preferred embodiments proof of path guarantees, proof of location and/or immediate detection of Sybil attacks in the network can be enabled.

Within a preferred realization of the invention a network user can connect to the controller that governs its own domain using a secure ENI, Endpoint-to-Network Interface, for requesting a network property. The ENI can be pre-defined. In this way, the ENI enables the user to directly ask for the provisioning of a path with some security properties or for proofs of network guarantees or other network properties.

If the requested network property extends outside the scope of the network user's domain the network user's domain governing controller can contact at least one other controller using a NNI, Network-to-Network Interface, for transmitting the requested network property.

If the requested network property can be provided within a network element or network elements controlled by the at least one other controller, the at least one other controller can provide a secure ACK to the network user's domain governing controller.

Within a further preferred embodiment the network user's domain governing controller generates a secure certificate that contains a secure commitment to the ACK or ACKs sent by the at least one other controller and/or contains a proof of correctness of said network user's domain governing controller and/or contains a statement certifying that the requested network property will be provided and/or contains a signature encapsulating this secure certificate. Such a resulting signed certificate can be called: proof of network guarantee. The encapsulated commitments can be used for liability/accountability purposes by the network user's domain governing controller, e.g., in case other controllers do misbehave.

With regard to an effective realization of the inventive concept the network user's domain governing controller and/or the at least one other controller can install a forwarding rule on its controlled network element or network elements to enable the requested network property. Within a further preferred embodiment the installed forwarding rule can include a secure tag derived from the secure certificate used to check the presence of said tag in network packets. Such a secure tag can be a packet header tag or a keyed-hash tag.

With regard to a very effective realization the secure tag taints all packets sent by the network user. Those packets that are tainted with this tag and that abide by installed rule will be treated specially in the network, thus satisfying the user's request.

If the requested network property is bound by time and/or size and/or by packet count, the network user's domain governing controller and/or the at least one other controller can install a temporary rule on its controlled network element or network elements, wherein said temporary rule will be deleted, once time, size and packet count, respectively, has been reached. This will result in minimum overhead on the controller in maintaining these rules.

The entire method can be overloaded with an attestation of the controller. Concretely, an attestation of the network user's domain governing controller and/or the at least one other controller can be performed for establishing a correctness of the network user's domain governing controller and/or the at least one other controller.

Concretely, the requested network property can comprise the guarantee that a data transmission or communication over a path is performed over defined nodes or switches and/or is performed under consideration of a set of constraints on a paths length and/or on a Quality of Service on the path. Additionally or alternatively the requested network property can comprise the guarantee that a data transmission or communication over a path is performed under consideration of a set of constraints on the nodes or switches that the path traverses.

Various constraints on the nodes or switches could be considered.

Within a further preferred embodiment the SDN can be realized by OpenFlow.

Embodiments of the present invention can provide the construction of self-verifiable, secure and accountable receipts that can be used to prove various network properties, e.g., network location, path guarantees, while incurring minimum overhead on the controllers.

Further, embodiments of the invention can enable the tainting of "differentiated" packets with secure tags that can only be used by users equipped with a genuine certificate/receipt of network property originating from the controllers. These tags ensure minimum overhead on the controllers with regard to rule maintenance and policy compliance checks.

Further, embodiments of the invention can provide the combination of proofs of network properties with attestation protocols in order to establish guarantees on the correctness of the network.

Embodiments of the invention can provide:
1) Leveraging OpenFlow to enable differentiated services such as proof of location, or proofs of network/path guarantees.
2) Achieving verifiable, fully accountable, and unforgeable guarantees while minimizing the efforts required to detect possible misbehavior by malicious users.
3) A scalable and secure architecture that supports proofs of network guarantees.

Embodiments of the invention enable the acquisition of secure proofs of network guarantees or network properties be leveraging the OpenFlow functionality. Respective protocols can be implemented as part of an OpenFlow controller application and do not require any modification to the existing OpenFlow protocol specification.

Within a preferred embodiment we assume that a network user is interested in acquiring proofs of network guarantees from the operator in order to use it subsequently to access other online services. We further assume the existence of one or more colluding malicious users who wish to forge such proofs of network characteristics in order to fool existing online services. We additionally assume, however, that these users are computationally bounded, and as such cannot forge signatures, break encryption schemes, etc.

Within the preferred embodiments secure proofs of network properties, such as proof of network location or proof of path properties, are provided, while incurring minimal overhead on the SDN controllers. One solution requires the embedding of secure and unforgeable packet header tags that are tightly coupled with the contract that users signed with an operator.

Figure 2:
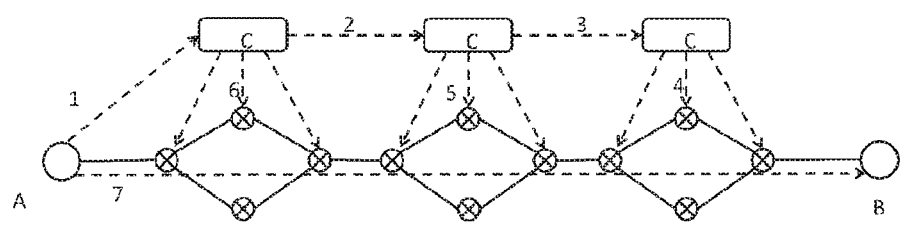
FIG. 2 depicts trustworthy network paths for multiple SDN domains.
Figure 3:
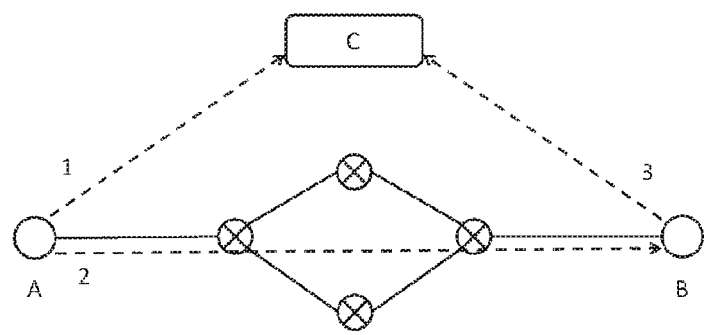
FIG. 3 depicts a proof of network location.

The numbers 1 to 3 within FIGS. 1 and 3 and numbers 1 to 7 within FIG. 2 represent the order in which messages between the entities are exchanged.

With regard to FIGS. 1 and 2, which are showing trustworthy network paths for a single SDN domain and for multiple SDN domains, the following embodiment of the method is preferred.

1. The user A connects to the controller C that governs its own domain using a secure pre-defined Endpoint-to-Network Interface, ENI. This interface enables A to directly ask for the provisioning of a path with some security properties, or for proofs of network guarantees, etc.

2. Upon receipt of the request, the controller derives the requirements/policies that need to be set/installed on the switches of the network. In case these policies extend outside the scope of its domain, the controller contacts other controllers using a Network-to-Network Interface (NNI) and informs them of the user requests. These controllers will also investigate the feasibility of the requested rules on their switches and will provide a secure and unforgeable ACK to the original controller that the appropriate rules can be indeed installed.
3. The controller will generate an unforgeable and secure certificate that contains a secure commitment to the ACKs sent by other controllers, a proof of correctness of the controller, a statement certifying that what the user requested will be provided, and a signature encapsulating this certificate. We call the resulting signed certificate: proof of network guarantee. Note that the encapsulated commitments can be used for liability/accountability purposes by the original controller, e.g., in case other controllers do misbehave.
4. If any controller needs to install any rule on the switches to enable the user request, the rule will check for the presence of a secure tag in the packets sent by the user. The secure tag is derived using a one way transformation solely from the proof of network guarantee, which will taint all packets sent by the user. Those packets that are tainted with this tag, and that abide by installed rule will be treated specially in the network, thus satisfying the user's request. Note that in case the user request is bound by size, or by packet count, the controller will install temporary rules that will be automatically deleted once time, or packet count, has been reached. As we show later, this entire process ensures the security of the entire scheme, while resulting in minimum overhead on the controller in maintaining these rules and verifying compliance. Indeed, in case of any violation, any controller can request from the users the proof of network guarantee and see whether it matches with the tag. The controller can then directly eliminate fake/forged packets by illegitimate users without the need to invest considerable resources.
5. This entire process can be overloaded with an attestation of the controller. This can be used to establish the correctness of the controller, and hence the correctness of the SDN or OpenFlow domain.

Embodiment 1: Trustworthy Network Paths

An exemplary property that can be required by a given user is to guarantee that the communication flow over a path satisfies some conditions. These conditions could be in the form of:
1. The ID of the nodes or switches on the path
2. A set of constraints on the path length/quality of service
3. A set of constraints on the nodes or switches that the path traverses, e.g., location.

In this case, the user A issues to the controller CONT over the ENI interface the following message:

M1:IP of A||pka||IP of end-node on the path||CONSTRAINTS||Duration of contract||Timestamp||R Here, || denotes message concatenation. A also appends the corresponding signature Sig(M1). Pka is included in this message in order to prevent IP spoofing, in case the spoofer is co-located with the user machine. R is a random fresh nonce used for attestation purposes. R could be computed as h(Timestamp).

Upon receipt of M1||Siga(M1), CONT checks the feasibility of the user's request given in the network topology. In case this request requires the cooperation of another collaborating domain, CONT forwards (M1||Siga(M1)||SigCONT(M1||Siga(M1)||Timestamp) to the collaborating controller CONT2. These controllers would then check the feasibility of installing the request in M1 on their domains and will issue an ACK:OK||M1||Siga(M1)||SigCONT(M1||Siga(M1)||Timestamp||ATTcont2, along with the signature SigCONT2(ACK). Here ATTcont2 is an attestation response by CONT2. Upon reception of the ACK, CONT issues a final ACK to A in the form:

RECEIPT:OK:IP of A||IP of end-node on the path||CONSTRAINTS||Duration of contract||Timestamp||h(ACK)||ATTcont, along with the signature on the RECEIPT.

The h(ACK) acts as a commitment that could be revealed anytime when challenged. In fact, in the case that the quality of service degrades, or the user is not satisfied, CONT can prove by showing ACK that CONT did its due diligence in satisfying the user's request. This also can be used to held another controller liable. Note that this entire process is recursive e.g., if CONT2 needs to involve another controller.

CONT also installs a rule matching to the request M1 and asks that all packets originating from IP of A destined to IP of end-node on the path that are tagged with the header filed h(RECEIPT) will undergo that rule.

This technique prevents forgery. Any other user cannot benefit from the rule. This is the case since any packet containing the same tag and originating from a malicious user will cause the message to be forwarded to the controller. The controller simply asks for the RECEIPT and checks if the receipt does indeed match the hash. If so, then the controller invests resources in resolving the problem. Otherwise, the connection is banned.

Alternative Variant:

Another way to achieve a similar functionality would be to rely on keyed-hashed tags. Here, the users would keep on updating the tags following the output of a keyed-hash function. However, this requires an additional functionality to be installed at the switches; indeed, these switches need to also be able to verify these tags and therefore require an algorithm that implements a keyed-hash.

Tag Implementation Strategy:

Several strategies can be exploited for the implementation of the TAG required in the network packets. In particular, any current protocol header can work as a TAG, provided that it is compatible with the properties of the network protocols. For example, the TOS field of IP header, VLAN or MPLS tags, are all candidates to this purpose. Another example is using an IPv6 source address that contains the TAG in the part defined by the end-point.

Sybil Attacks/Forgery Detection:

Given that A is connected to PORTa of switch SW1, during the A request for the path, CONT can store the knowledge that A is located at PORTa-SW1. Any tag h(RECEIPT) located at a different port/switch has to be immediately discarded or proper actions can be taken, e.g., asking for a new receipt.

When involving multiple domains and controllers, the procedure is recursive. A controller, when contacting another controller for setting up the trustworthy path, declares the entering port/switch to the next controller whose managed domain is on the path.

From this port/switch only correctly tagged packets are allowed to flow, since the transmitting domain has applied already filtering at its borders. Hence, a chain of controller collaborating for the provisioning of the path can actually guarantee that the path is taken only by allowed traffic, provided that each controller enforces the check on the starting point of the flow for its managed domain.

Embodiment 2: Proof of Network Location

We now propose another embodiment in which a user can obtain a verifiable proof of location certificate that he can present to any other service, thus proving that he has a machine operating from a given location.

Consider FIG. 3 where the endpoint A wants to establish a connection with B, but B requires A to prove that it is in a given location. A asks in first place a certification token to C, who is charge of controlling the network between A and B. C is the controller of the domain of A.

Here, A issues the following request:
M1:IP of A||pka||LocationRequest||Timestamp||R
Along with the signature Sig(M1).

Upon request of M1, the controller, then verifies Sig(M1) matches with pka, verifies the IP of A, and then issues the following proof of location (POL) response:
POL:IP of A||pka||Country/city/area||Timestamp||ATTb||R||h(M1)
Along with its signature Sig(POL). A then forwards POL Sig(POL) to B who can verify the authenticity of POL.

Another Variant:

A variant protocol can be established to allow B to directly query the location of A. Here, if B and A are not in the same OpenFlow domain, then the controller of the domain of B will forward B's request to the corresponding controller.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for providing a guarantee of a network property from a network in which a domain governing controller governing a domain of a network user provides a Software-Defined Networking (SDN) functionality between a plurality of nodes, the method comprising:
receiving, from the network user, a signature and a request for the network property, wherein the request for the network property includes a public key of the network user;
verifying that the signature received from the network user matches the public key of the network user;
demonstrating the capability of providing the network property by determining policies to be installed on nodes of the network so as to enable the network property to be provided;
generating, in response to the demonstrating the capability of providing the network property, a secure certificate that contains a secure acknowledgment (ACK) of a commitment to provide the network property; and
providing the secure certificate to the network user as a guarantee of the network property,
wherein the requested network property is bound by at least one of time, size, or packet count, and
wherein the policies to be installed include a temporary rule that will be deleted once reaching a bound of at least one of time, size, or packet count.

2. The method according to claim 1, wherein the network property is at least one of a network location, a path property, or a path guarantee.

3. The method according to claim 1, wherein a Public Key Infrastructure (PKI) is provided within the network.

4. The method according to claim 3, wherein each controller in a group of a definable number of controllers know a public key of the other controllers.

5. The method according to claim 1, wherein a trusted computing base is provided within the network.

6. The method according to claim 1, wherein a tamper-resistant hardware populates the at least one controller.

7. The method according to claim 1, wherein the network user is equipped with a public key and private key pair.

8. The method according to claim 1, wherein the signature and the request for the network property are received by the domain governing controller via a secure Endpoint-to-Network Interface (ENI).

9. The method according to claim 8, further comprising contacting, by the domain governing controller, at least one other controller via a Network-to-Network Interface (NNI); and
transmitting the network property to the at least one other controller using the NNI.

10. The method according to claim 9, wherein the at least one other controller provides a secure acknowledgement (ACK) of a commitment to provide the network property to the domain governing controller in response to a determination, by the at least one other controller, that one or more network nodes controlled by the at least one other controller are capable of providing the network property.

11. The method according to claim 10, wherein the secure certificate at least one of: includes the secure acknowledgment (ACK) of the commitment to provide the network property provided by the at least one other controller, contains a proof of correctness of the domain governing controller, or contains a statement certifying that the requested network property will be provided.

12. The method according to claim 1, further comprising installing the policies to be installed on nodes of the network so as to enable the network property to be provided.

13. The method according to claim 12, wherein the installed policies include a forwarding rule that determines whether network packets include a secure tag derived from the secure certificate provided to the network user.

14. The method according to claim 13, wherein the secure tag is a packet header tag.

15. The method according to claim 13, wherein the secure tag is a keyed-hash tag.

16. The method according to claim 13, wherein the secure tag taints all packets sent by the network user.

17. The method according to claim 1, further comprising performing an attestation of the domain governing controller for establishing a correctness of the domain governing controller.

18. The method according to claim 1, wherein the requested network property comprises a guarantee that a data transmission or communication over a path is performed over defined nodes or switches.

19. The method according to claim 1, wherein the requested network property comprises a guarantee that a data transmission or communication over a path is performed under consideration of a set of constraints on at least one of a path length or a Quality of Service (QoS) on the path.

20. The method according to claim 1, wherein the requested network property comprises a guarantee that a data transmission or communication over a path is performed under consideration of a set of constraints on the nodes or switches that the path traverses.

21. The method according to claim 1, wherein the SDN is realized by OpenFlow.

22. A network for providing a guarantee of a network property, the network comprising:
a domain governing controller governing a domain of a network user configured to:
provide a Software-Defined Networking (SDN) functionality between a plurality of nodes,
receive, from the network user, a signature and a request for the network property, wherein the request for the network property includes a public key of the network user;
verify that the signature received from the network user matches the public key of the network user;
demonstrate the capability of providing the network property by determining policies to be installed on nodes of the network so as to enable the network property to be provided
generate, in response to demonstrating the capability of providing the network property, a secure certificate that contains a secure acknowledgment (ACK) of a commitment to provide the network property; and
provide the secure certificate to the network user as a guarantee of the network property,
wherein the requested network property is bound by at least one of time, size, or packet count, and
wherein the policies to be installed include a temporary rule that will be deleted once reaching a bound of at least one of time, size, or packet count.

* * * * *